United States Patent [19]

Potter

[11] E Patent Number: Re. 33,454

[45] Reissued Date of Patent: Nov. 27, 1990

[54] WEAR RUNNER FOR EXCAVATING BUCKET

[75] Inventor: James T. Potter, Salem, Oreg.

[73] Assignee: ESCO Corporation, Portland, Oreg.

[21] Appl. No.: 281,630

[22] Filed: Dec. 9, 1988

Related U.S. Patent Documents

Reissue of:

[64] Patent No.: 4,716,666
Issued: Jan. 5, 1988
Appl. No.: 912,269
Filed: Sep. 29, 1986

[51] Int. Cl.[5] ..... E02F 9/28

[52] U.S. Cl. ..... 37/135; 172/719; 172/751; 241/300; 403/331; 403/381

[58] Field of Search ..... 37/135, 141 R, 141 T, 37/142 R, 118, DIG. 3, DIG. 12; 172/719, 751, 753; 403/331, 380, 381; 193/2 R; 241/300

[56] References Cited

U.S. PATENT DOCUMENTS

| | | | |
|---|---|---|---|
| 2,325,336 | 7/1943 | Mikan | 37/135 |
| 3,500,562 | 3/1970 | Reinhard | 37/141 R |
| 3,982,339 | 9/1976 | Nilsson | 37/142 R X |
| 4,457,380 | 7/1984 | Curry | 37/141 R X |

*Primary Examiner*—Edgar S. Burr
*Assistant Examiner*—Moshe I. Cohen
*Attorney, Agent, or Firm*—Tilton, Fallon, Lungmus & Chestnut

[57] ABSTRACT

A wear runner for an excavating bucket which includes a plurality of base elements secured to the bucket in end-to-end relation, a runner element for each base element removably mounted thereunder by means of a rearwardly divergent dovetail.

13 Claims, 2 Drawing Sheets

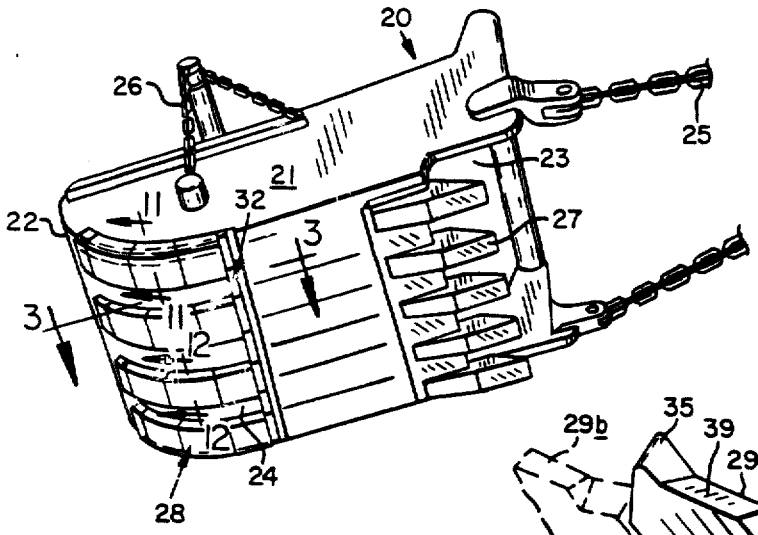
FIG. 1
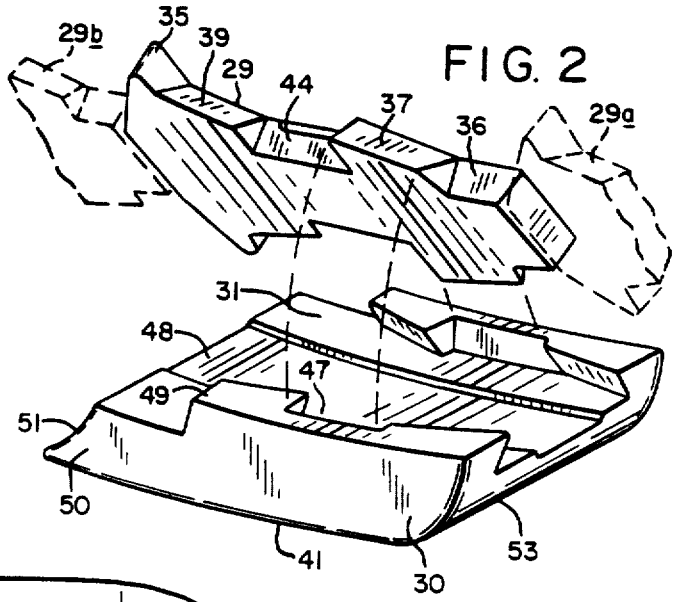
FIG. 2
FIG. 3
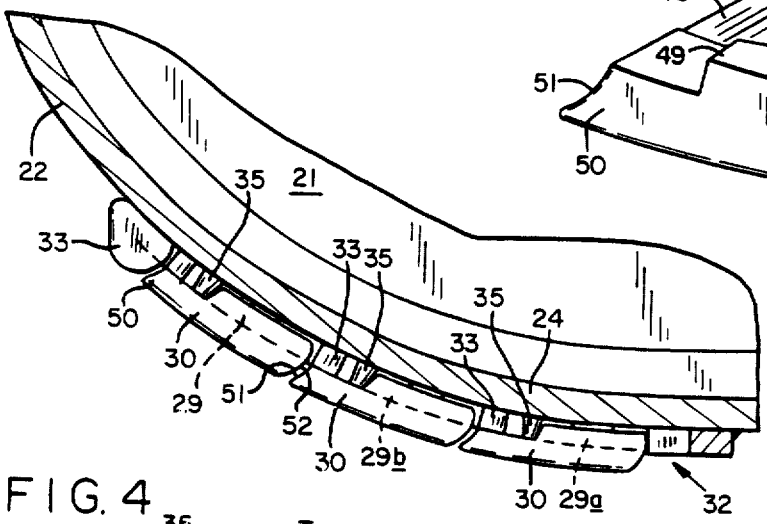
FIG. 4
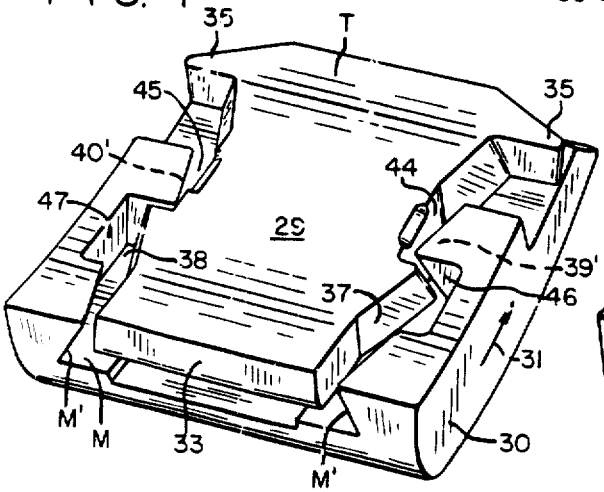
FIG. 5
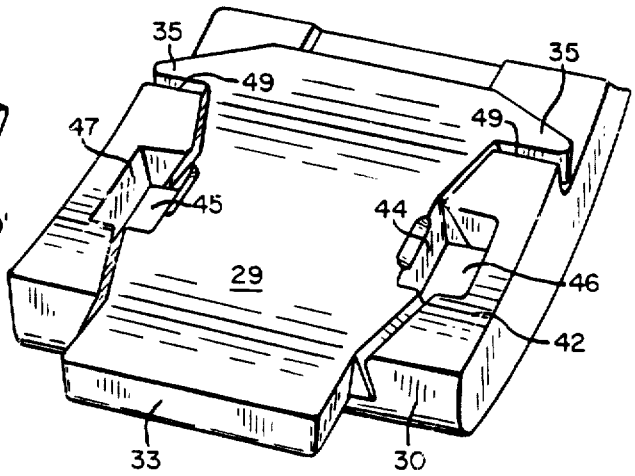

WEAR RUNNER FOR EXCAVATING BUCKET

Matter enclosed in heavy brackets [ ] appears in the original patent but forms no part of this reissue specification; matter printed in italics indicates the additions made by reissue.

*This is a reissue of U.S. Ser. No. 912,269, filed Sept. 29, 1986 which matured into U.S. Pat. No. 4,716,666.*

BACKGROUND AND SUMMARY OF INVENTION

This invention relates to a wear runner for an excavating bucket and, more particularly to a multipart runner which permits replacement of wearable surfaces.

The buckets to which the instant invention has advantageous application are dragline buckets which are normally equipped with welded on runner strips. These strips extends along the bottom wall longitudinally from the open front of the bucket to the closed rear. Exemplary of runners which have been used for many years are those seen in U.S. Pat. Nos. 2,492,905 and 2,723,471. These runners were employed to protect the bottom wall of the bucket against undue wear but necessitated considerable down-time when runner replacement was indicated. Other types of elements secured to bucket bottoms are those seen in U.S. Pat. Nos. 1,244,117 and 2,325,336.

The instant invention in providing replaceable runners makes use of a dovetail connection between a wearable element and a base element adapted to be generally permanently secured to the bucket bottom. Dovetail connections between a wearable part and a base part have been employed in excavating equipment previously. For example, a wear cap for one type of excavating tooth is seen in co-owned U.S. Pat. No. 2,896,345 and a wear cap for a second type of excavating tooth is seen in co-owned U.S. Pat. No. 3,082,555. In recent years, however, the dovetail connection for wear caps has been discontinued for newer tooth designs as seen in co-owned U.S. Pat. Nos. 4,317,300 and 4,326,348.

The inventive dovetail connection differs from those employed previously in connection with tooth wear caps in having the dovetail surfaces diverge so that the wearable element in the process of installation not only becomes more tightly affixed to the base element but also moves upwardly and into closer contact therewith.

Other objects and advantages of the invention may be seen in the details of construction and operation set down in the ensuing specification.

The invention is described in conjunction with an illustrative embodiment in the accompanying drawing, in which FIG. 1 is a fragmentary perspective view of a dragline bucket as viewed from the bottom left side as viewed from the operator's perspective;

FIG. 2 is an exploded perspective view of the base and runner elements with adjoining base elements shown fragmentarily and in phantom;

FIG. 3 is an enlarged longitudinal sectional view such as would be seen along the sight line 3—3 of FIG. 1;

FIG. 4 is a perspective view of the base and wear elements of the invention in the initial process of installation;

FIG. 5 is a view similar to FIG. 4 but showing the elements thereof in final assembly;

Figure 6:
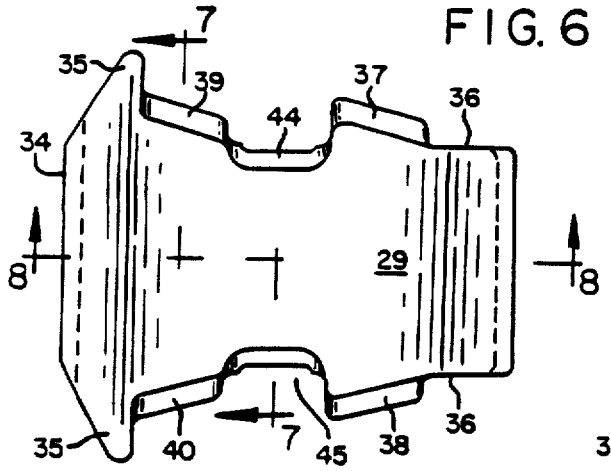
FIG. 6 is a top plan view of the base element of the runner assembly.
Figure 7:
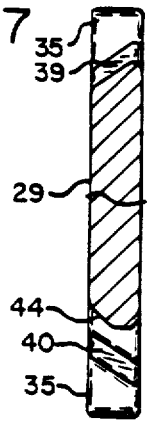
Figure 8:
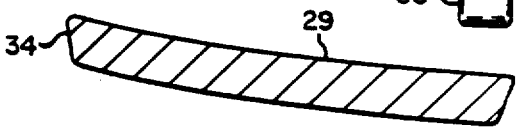
Figure 9:
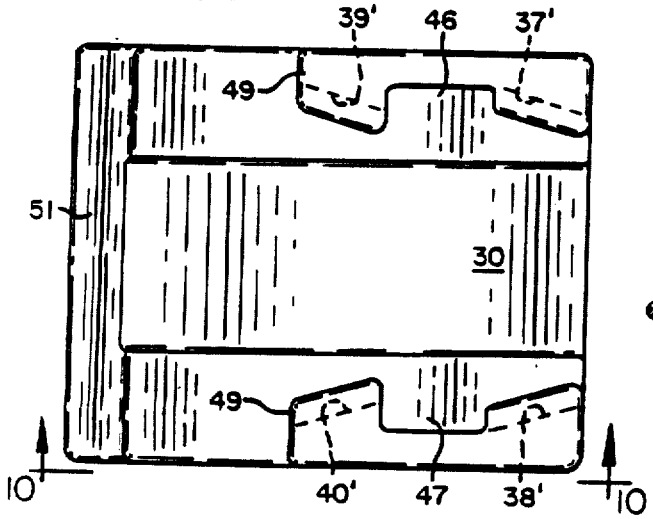
Figure 10:
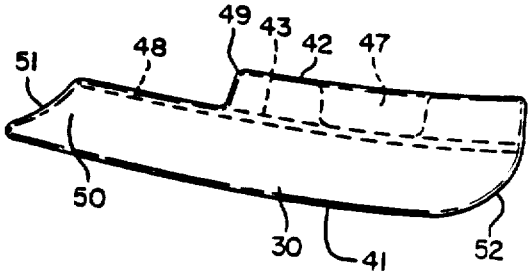
Figure 11:
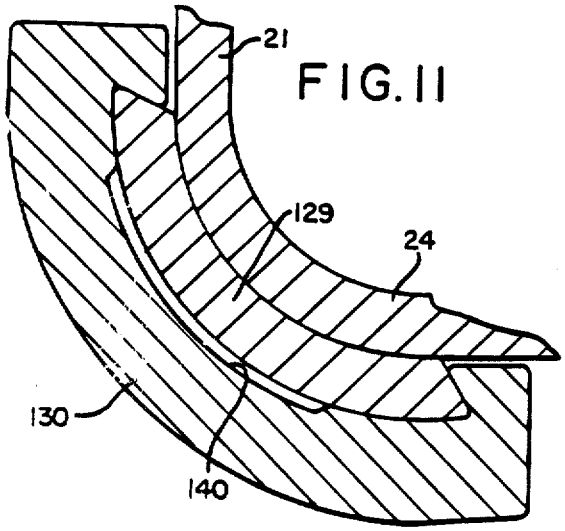
Figure 12:
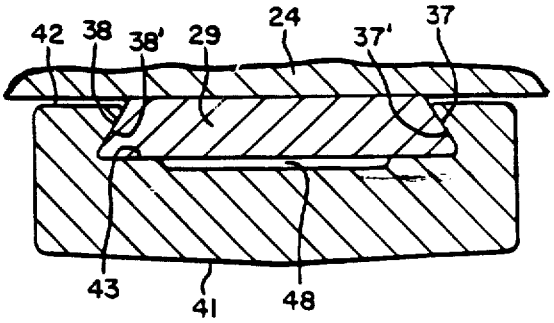

FIGS. 7 and 8 are sectional views taken, respectively, along sight lines 7—7 and 8—8 as applied to FIG. 6;

FIG. 9 is a top plan view of the runner element of the invention;

FIG. 10 is a side elevational view such as would be seen along the sight line 10—10 as applied to FIG. 9; and FIGS. 11 and 12 are fragmentary sectional views such as would be seen along the sight lines 11—11 and 12—12 as applied to FIG. 1.

DETAILED DESCRIPTION

In the illustration given and with reference first to FIG. 1, the numeral 20 designates generally a dragline bucket having a pair of opposed sidewalls 21, a rear wall 22 and an open front 23. The rear wall merges into a bottom wall 24 which terminates in the open front 23. Drag chains as at 25 are connected to the forward ends of the side walls 21 and hoist chains 26 are connected to an intermediate part of the sidewalls 21.

The forward edge or lip of the bottom wall 24 is equipped with a plurality of forwardly projecting excavating teeth 27. The foregoing construction is generally conventional and is set down for explaining the environment of the invention.

The numeral 28 designates generally a longitudinally extending runner of which a plurality are provided in transversely spaced relation on the bottom wall 24 of the bucket 20.

Each runner assembly includes a plurality of base elements 29 (see FIG. 2) which are welded to the underside of the bucket in serial or longitudinally aligned relation. In FIG. 2 the adjacent forward base element is seen fragmentarily and in phantom and is designated 29a. The base element immediately rearward of the solid line depiction in FIG. 2 is also shown fragmentarily and is designated by the numeral 29b.

For each base element 29 I provide a runner element 30—also seen in perspective in FIG. 2.

As can be appreciated from a consideration of FIG. 3, a plurality of base elements 29 are secured as by welding to the bottom wall 24 and extending around onto the back wall 22. These are arranged in end-to-end generally abutting relation so as to form, in effect, a continuous rail for the receipt of a similar plurality of the runner elements 30.

In the illustration given, each runner element is installed by movement toward the base element 29, i.e., in the direction of arrow 31 in FIG. 2. Thereafter, the runner element 30 is slid rearwardly as in the direction of the arrow 31 applied to FIG. 4. Ultimately, the runner element 30 extends rearwardly beyond the base element 29 a short distance as is shown in FIG. 5. This results in a secure lock developed by the divergent dovetail-shaped walls which will be described in greater detail hereinafter.

End Locks

After the runner elements 30 have been installed as seen in FIGS. 1 and 3, I secure the same in position by means of welding a series of blocks 32 at the front of the most forward runners 30 and rearward of the teeth 27. More particularly, the blocks or stops 32 are welded between two adjacent base elements 29 so that one block or stop can effectively be a block for two runner elements—the actual installation having runners more closely located than illustrated in FIG. 1.

It will be appreciated that the normal forward movement of the dragline bucket 20 exert a rearward or setting force on each of the runner elements 30. It is only in the unusual circumstance where the bucket is dragged rearwardly against the ground where an unseating force for the runner elements is encountered. Thus, there is not required a strong lock or block to maintain the runner elements in place. Also, by utilizing a readily removable block, removal and replacement of the runner elements 30 is facilitated.

Also to protect the replaceable runners against the unusual backward drag of the bucket 20, I provide a guard 33—seen only in FIG. 3 and at the left hand side thereof. This, advantageously, may be half of an 8" steel pipe, split longitudinally. This projects downwardly to mask the rear most runner element 30 to prevent the same from being "peeled" off by the abnormal backward movement of the bucket.

Base Element Details

The base element 29 is seen in FIGS. 6–8 and includes a relatively elongated, plate-like body. The rear end 34, i.e., the end positioned toward the rear of the bucket when installed, is laterally enlarged to provde arms 35. These provide safety stops for the runner element 30 as can be appreciated from a consideration of FIG. 5.

Each of the longitudinal sides 36 of the body 33 is equipped with longitudinally spaced pairs of divergent dovetail surfaces as at 37, 38, 39 and 40. The dovetail shape is developed by a downward and outward flare as can be appreciated readily from a consideration of FIGS. 7 and 12. The flare or angle is about 30° relative to the vertical. The divergence—in proceeding rearwardly is of the order of about 15° relative to the longitudinal axis, i.e., the axis along which the runner element 30 is moved for installation as indicated by the arrow 31 of FIG. 4. The slope and divergence provide for an especially advantageous mounting of the runner elements 30 on the base elements 29—as the runner elements move more rearwardly they ride up the slope of the surfaces 37–40 to pull the runner element 30 closer and closer to the base element 29. The arms 35 provide a safety stop when the clearance between the confronting dovetail surfaces on the two elements is larger than normal. The confronting surfaces on the runner element 30 are clearly seen in FIG. 9 and are designated by the numerals 37', 38', 39' and 40'—corresponding to the surfaces on the base element which they confront.

Runner Element Details

Referring particularly to FIGS. 9 and 10, the runner element 30 is again a generally platelike body and is generally rectangular in plan providing a lower face 41 which, when installed, rides against the ground. The upper face 42 is rabbeted or grooved so as to receive the base element 29—see particularly FIG. 12 where the numeral 43 designates the base of the rabbet.

As indicated previously, the confronting surfaces 37'–40' on the runner element 30 are disposed substantially identically to those provided on the base element 29, i.e., the surfaces 37–40. In both elements, the surfaces are arranged in two longitudinally spaced apart pairs with the surfaces in each pair being on opposite sides. This effectively cuts down the amount of movement needed for installation. Inasmuch as each surface, for example, the surface 37, has an axial length of about $2\frac{3}{4}$", it is only needed to move the runner element 30 this distance for seating—yet the dovetail or wedging action achieved is that equivalent to twice the amount, viz., $5\frac{1}{2}$". To achieve this advantage, I equip the base element 33 with opposed notches as at 44 and 45. This permits the entry of the portions of the runner element carrying the surfaces 39' and 40' in the fashion indicated in FIG. 4.

In the same fashion, I provide opposed notches as at 46 and 47 in the runner element 30 for the accommodation of the portions of the wear elements 29 carrying the dovetail surfaces 37 and 38—again see FIG. 4. When installed, these notches are aligned as can be appreciated from a consideration of FIG. 5.

I also provide a slight relief down the center of the rabbet as at 48—see particularly FIG. 12. This insures that the central portion of the rabbet is not higher than the sides in bearing as at 43.

The upper face 42 of the runner element 30 extends only partway of the length of the element so as to develop a shoulder as at 49 (see FIG. 10) which can cooperate with the arms 35 in the fashion indicated in the right hand portion of FIG. 5. The remainder of the rearward portion as at 50 extends beyond the associated base element 29 into underlying relation with the next rearward base element—see particularly the elements 29 and 29b of FIG. 3. The extreme rearward end of each runner element as at 51 is curved so as to conform with the forward end 52 of the adjacent element—see also FIG. 3.

The bottom 24 of the bucket 20 is not flat but slightly arcuate and therefore the same type of curvature is provided in the elements 29 and 30—compare FIGS. 8 and 10.

Where the elements are at the "corners" of the bucket, i.e., the junction of the sidewalls 21 and the bottom wall 24, I provide transversely arcuate elements as at 129 and 130 as illustrated in FIG. 11. Again there is provided a relief as at 148. However, the operation is identical to that previously described with respect to the more flatter elements.

OPERATION

The invention provides replaceable wear runners for excavating equipment such as a dragline bucket 20 (see FIG. 1). The replaceable runners 28 take the place of the conventional weld on strips of the prior art. Each runner 28 includes a series of base elements 29 (see FIG. 2) which are welded to the bottom wall 24 of the bucket 20—as at 29a, 29, 29b, etc. in FIG. 3. The runners 28 normally will extend rearwardly up onto the rear wall 22 which merges gradually into the bottom wall 24.

After the base elements 29 have been installed, the runner elements 30 are installed in sequence. For example, in FIG. 3, the left most runner element 30 is installed by placing the runner element on the base element in the configuration depicted in FIG. 4. The base element 29 in effect provides the Tenon which is received within the mortise of the runner element 30. The Mortise M or rabbet is defined by sidewalls as at M' (still referring to FIG. 4) which diverge in proceeding rearwardly and which also are sloped or flared downwardly and outwardly to provide a dovetail fit with correspondingly contoured surface on the base element 29.

The sloping divergent sidewalls provide dovetail surfaces arranged in two longitudinally spaced pairs with the surfaces in each pair being on opposite sidewalls—see, for example in FIG. 9 the forward pair 37' and 38' and the more rearward pair 39' and 40'. The rearward divergence, in the illustration given, is about 15° from the longitudinal axis and the slope or flare is about 30° to the vertical—see particularly FIG. 12. By providing the separate pairs of connecting or bearing surfaces, I am able to install the wear runner with limited movement—a movement of approximately 3" can yield a bearing length of about 6". To accomplish this, notches are provided between the pairs of bearing surfaces as 46 and 47—see FIG. 4.

The base element 29 is equipped with laterally extending arms as at 35 which provides safety stops for the rearward movement of the runner element 30. In some instances, the confronting bearing surfaces on the base element 29—as at 37–40—can become worn after a number of replacement runner elements have been installed and therefore there is the possibility that the runner element would move too far rearwardly. This is prevented by the cooperation of the arms 35 and the shoulders 49 provided on the runner element 30.

To complete the operation, I provide a forward stop at 32 (see the right hand portion of FIG. 3) which prevents the runner elements from being inadvertently detached should the bucket be dragged rearwardly. Also, I provide a guard or mask for the rear end of each runner in the form of the guard 33 which prevents a rock or the like from being hooked on the projecting part 50 of the runner element 30 and therefore constitutes a potential means for stripping off the runner element.

Replacement is readily achieved merely by burning off the block or blocks 32 and removing some or all of the runner elements 30 which have become unduly worn. This can be done readily in the field with a minimum of downtime—which is important inasmuch as the buckets in question are used in remote, often primitive places and because of their size 50–150 cubic yards capacity, are expensive to pull out of work. Also, the invention provides readily handleable elements. For example, for a bucket of the size indicated, each runner element 30 is approximately 16" long, approximately 13" wide and approximately 4" in thickness. By segmenting the runner, not only are the replacement elements more handleable but also can approximate the curvature of the bucket readily—as contrasted to taking a corresponding long runner strip and forming it to the curvature of the bucket.

The invention is additionally advantageous in that the base elements 29 which are welded together longitudinally provide bottom support for the basket portion of the bucket—thereby eliminating the need for additional supports for this purpose. Additionally, the back stop 33 provides lateral support for the bucket as do the stop blocks 32 welded across the front of the base elements 29.

While in the foregoing specification a detailed description of an embodiment of the invention has been set down for the purpose of illustration, many variations in the details hereingiven may be made by those skilled in the art without departing from the spirit and scope of the invention.

I claim:

1. A wear runner for an excavating bucket or the like defining a longitudinal direction extending from a mouth portion of the bucket to the rear of the bucket comprising a plurality of base elements secured adjacent one another to said bucket in end-to-end relation in the longitudinal direction, each base element having divergent sloped side edges, a runner element for each base element and equipped with a plurality of runner element mounting means enabling the mounting of said runner elements serially on said base elements by sliding in the longitudinal direction, said mounting means including upstanding rearwardly divergent, sloped side shoulders dovetailed with said base side edges, and stop means secured to said bucket maintaining said runner elements in assembled fashion.

2. The runner of claim 1 in which each element has a pair of spaced apart dovetail surfaces on each side.

3. The runner of claim 2 in which each runner element is equipped with an inwardly extending notch between each pair of spaced apart dovetail surfaces to accommodate receipt of a portion of the base element side incident to assembly.

4. The runner of claim 3 in which each base element is equipped with a laterally enlarged end portion.

5. The runner of claim 4 in which each runner element has a flange-like projection extending under and beyond said laterally enlarged end portion of said base element.

6. A dragline bucket runner construction for a bucket having a bottom wall, said bottom wall extending longitudinally from the closed rear to the open front of the bucket, a plurality of longitudinally extending, transversely spaced runner assemblies mounted on the exterior of said bottom wall, each runner assembly comprising:

a plurality of base elements welded to said bottom wall in series fashion, each base being rearwardly divergently rabbeted to provide a dovetail-shaped tenon, a runner element correspondingly rabbeted to provide a dovetail-shaped mortise slidingly mounted on each base element, and block means at the front of each runner assembly maintaining said elements in assembled fashion.

7. An assembly of replaceable runner elements for a bucket or the like comprising a plurality of unitary generally rectangular, relatively elongated bodies each having a lower face adapted to engage the ground when the elements are installed in end to end relation and an upper face adapted to be connected to a bucket, said upper surface having a longitudinally extending rabbet providing two longitudinally spaced apart pairs of opposed dovetail-shaped mounting surfaces, the surfaces in each pair being longitudinally divergent.

8. The replaceable runner element of claim 7 in which said upper face terminates short of the lower face to provide a stop-engagable shoulder.

9. The replaceable runner element of claim 8 in which said opposed mounting surfaces are divergent in the direction of said shoulder.

10. The replaceable runner element of claim 7 in which said runner element has a longitudinal axis along which said element is moved in being installed, said surfaces being disposed at a minor acute angle to said axis, and a pair of opposed notches in said rabbet between said surface pairs.

11. A replaceable wear runner element for a dragline bucket or the like comprising unitary relatively elongated plate-like body having forward and rear ends and an undersurface adapted to engage the ground, said body having an upper surface adapted to be positioned in confronting relation to the underside of a bucket, said upper surface at its forward end being equipped with laterally spaced integral upstanding portions providing confronting interior walls, said walls being arranged in two longitudinally spaced pairs separated by a notch in each wall, said walls being rearwardly divergent at an angle of about 30°, each wall being downwardly and outwardly sloped at an angle of about 30° to the vertical, parts of the walls in one pair being longitudinally aligned with corresponding parts of the walls in the other pair, said upstanding portions terminating a spaced distance from said body rear end.

12. The replaceable wear runner element of claim 11 in which said notches each have a longitudinal extent approximately the same length as that of each of said walls.

*13. A replaceable wear element for installation on the wearable portion of a structure engageable with abrasive material comprising*

*a unitary relatively elongated, generally rectangular plate-like body having end and sidewalls and top and bottom surfaces, one of said surfaces being adapted to engage said abrasive material,*

*the other of said top and bottom surfaces being adapted to be positioned in confronting relation to said wearable portion,*

*said other surface adjacent both sidewalls being equipped with laterally spaced integral outstanding portions providing opposed walls, said walls being arranged in two longitudinally spaced pairs separated by a notch in each wall,*

*said walls being longitudinally divergent at an angle of about 30°, each wall being sloped outwardly and toward said one surface at an angle of about 30°, parts of the walls in one pair being longitudinally aligned with corresponding parts of the walls in the other pair,*

*said plate-like body terminating a spaced distance from said opposed walls to protect a cooperating base element secured to said wearable portion.*

* * * * *